(12) United States Patent
Lahtinen (10) Patent No.: US 10,291,724 B2
(45) Date of Patent: May 14, 2019

(54) METHOD, APPARATUS AND COMPUTER PROGRAM PRODUCT FOR ENABLING ACCESS TO A DYNAMIC ATTRIBUTE ASSOCIATED WITH A SERVICE POINT

(75) Inventor: Pekka Lahtinen, Helsinki (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 726 days.

(21) Appl. No.: 11/869,993

(22) Filed: Oct. 10, 2007

(65) Prior Publication Data

US 2009/0100003 A1    Apr. 16, 2009

(51) Int. Cl.
*G06F 17/30* (2006.01)
*H04L 29/08* (2006.01)
*H04W 4/02* (2018.01)
*H04W 4/18* (2009.01)

(52) U.S. Cl.
CPC .............. *H04L 67/16* (2013.01); *H04L 67/18* (2013.01); *H04W 4/02* (2013.01); *H04W 4/18* (2013.01); *H04L 67/104* (2013.01)

(58) Field of Classification Search
CPC ... G06F 17/30817; G06F 17/30; H04L 67/16; H04L 67/18; H04L 67/104; H04W 4/18; H04W 4/02

USPC ............................................. 707/781; 725/62
See application file for complete search history.

(56) References Cited

U.S. PATENT DOCUMENTS

| 2004/0010553 | A1 | 1/2004 | Katz et al. |
| 2005/0188399 | A1 | 8/2005 | Tischer |
| 2007/0280165 | A1* | 12/2007 | Doshi ............... H04L 41/12 370/331 |

FOREIGN PATENT DOCUMENTS

| EP | 1 770 956 A1 | 4/2007 |
| GB | 2 403 099 A | 12/2004 |

\* cited by examiner

*Primary Examiner* — Kristopher Andersen
(74) *Attorney, Agent, or Firm* — Borden Ladner Gervais LLP (57) ABSTRACT

An apparatus for enabling a user to access a dynamic attribute associated with a service point may include a processing element. The processing element may be configured to receive an indication of a dynamic attribute associated with a service point having a particular geographic location, indicate an availability of the dynamic attribute to a user, and enable the user to access the dynamic attribute in response to a user selection. The dynamic attribute may be provided from a mobile content source proximate to the particular geographic location.

20 Claims, 6 Drawing Sheets

METHOD, APPARATUS AND COMPUTER PROGRAM PRODUCT FOR ENABLING ACCESS TO A DYNAMIC ATTRIBUTE ASSOCIATED WITH A SERVICE POINT

TECHNOLOGICAL FIELD

Embodiments of the present invention relate generally to content sharing technology and, more particularly, relate to a method, device, mobile terminal and computer program product for providing enhancements to search and/or map services involving content sharing.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. Alternatively, the network device may respond to commands or request made by the user (e.g., content searching, mapping or routing services, etc.). The services may be provided from a network server or other network device, or even from the mobile terminal such as, for example, a mobile telephone, a mobile television, a mobile gaming system, etc.

Due to the ubiquitous nature of mobile communication devices, people of all ages and education levels are now utilizing mobile terminals to communicate with other individuals or contacts and/or to share information, media and other content. Additionally, given recent advances in processing power, battery life, and the availability of peripherals such as video/audio recording, mobile terminals are becoming prolific producers and consumers of media. Content sharing applications and platforms have been developed to enable the sharing of the content created by mobile terminals and other devices to a wide audience via the Internet using such mechanisms as My Space, YouTube and other popular content sharing mechanisms. More recently, even the ability to share live content has been developed. However, although the sharing of live content is currently possible, it is common for receivers of the content to manually locate and connect to sources of such content at fixed locations and/or times. Peer-to-peer (P2P) content sharing is also becoming more popular. However, P2P content sharing is often performed among close circles of contacts.

Accordingly, it may be desirable to provide an improved content sharing mechanism, which may overcome at least some of the disadvantages described above.

BRIEF SUMMARY

A method, apparatus and computer program product are therefore provided to enable a user to access a dynamic attribute associated with a service point. In particular, a method, apparatus and computer program product are provided that may enable a user to access content recorded at a service point associated with a particular geographic location via, for example, a P2P connection. Accordingly, for example, a user viewing a map of an area including the particular geographic location or a user conducting a search associated with the service point may be able to determine that content recorded at or in association with the service point is currently available. The user may then select the content in order to access the content via a P2P or other connection.

In one exemplary embodiment, a method of enabling a user to access a dynamic attribute associated with a service point is provided. The method may include receiving an indication of a dynamic attribute associated with a service point having a particular geographic location, indicating an availability of the dynamic attribute to a user, and enabling the user to access the dynamic attribute in response to a user selection. The dynamic attribute may be provided from a mobile content source proximate to the particular geographic location. Alternatively, the method may include receiving an indication of dynamically occurring streamed content associated with a service point having a particular geographic location in which the streamed content is provided from a content source proximate to the particular geographic location, indicating an availability of the dynamically occurring streamed content to a user via a map service, and enabling the user to access the dynamically occurring streamed content in response to a user selection.

In another exemplary embodiment, a computer program product for enabling a user to access a dynamic attribute associated with a service point is provided. The computer program product includes at least one computer-readable storage medium having computer-readable program code portions stored therein. The computer-readable program code portions include first, second and third executable portions. The first executable portion is for receiving an indication of a dynamic attribute associated with a service point having a particular geographic location. The second executable portion is for indicating an availability of the dynamic attribute to a user. The third executable portion is for indicating an availability of the dynamic attribute to a user, and enabling the user to access the dynamic attribute in response to a user selection. The dynamic attribute may be provided from a mobile content source proximate to the particular geographic location.

In another exemplary embodiment, an apparatus for enabling a user to access a dynamic attribute associated with a service point is provided. The apparatus may include a processing element. The processing element may be configured to receive an indication of a dynamic attribute associated with a service point having a particular geographic location, indicate an availability of the dynamic attribute to a user, and enable the user to access the dynamic attribute in response to a user selection. The dynamic attribute may be provided from a mobile content source proximate to the particular geographic location.

In another exemplary embodiment, an apparatus for enabling a user to access a dynamic attribute associated with a service point is provided. The apparatus includes means for receiving an indication of a dynamic attribute associated with a service point having a particular geographic location, means for indicating an availability of the dynamic attribute to a user, and means for indicating an availability of the dynamic attribute to a user, and enabling the user to access the dynamic attribute in response to a user selection. The dynamic attribute may be provided from a mobile content source proximate to the particular geographic location.

Embodiments of the invention may provide a method, apparatus and computer program product for advantageous employment in content sharing environments including a mobile electronic device environment, such as on a mobile terminal capable of creating and/or viewing content items and objects related to various types of media. As a result, for example, mobile terminal users may enjoy an improved content sharing capability and service points may enjoy an increase in publicity or advertising based on the availability of live content related to activity at the service point.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
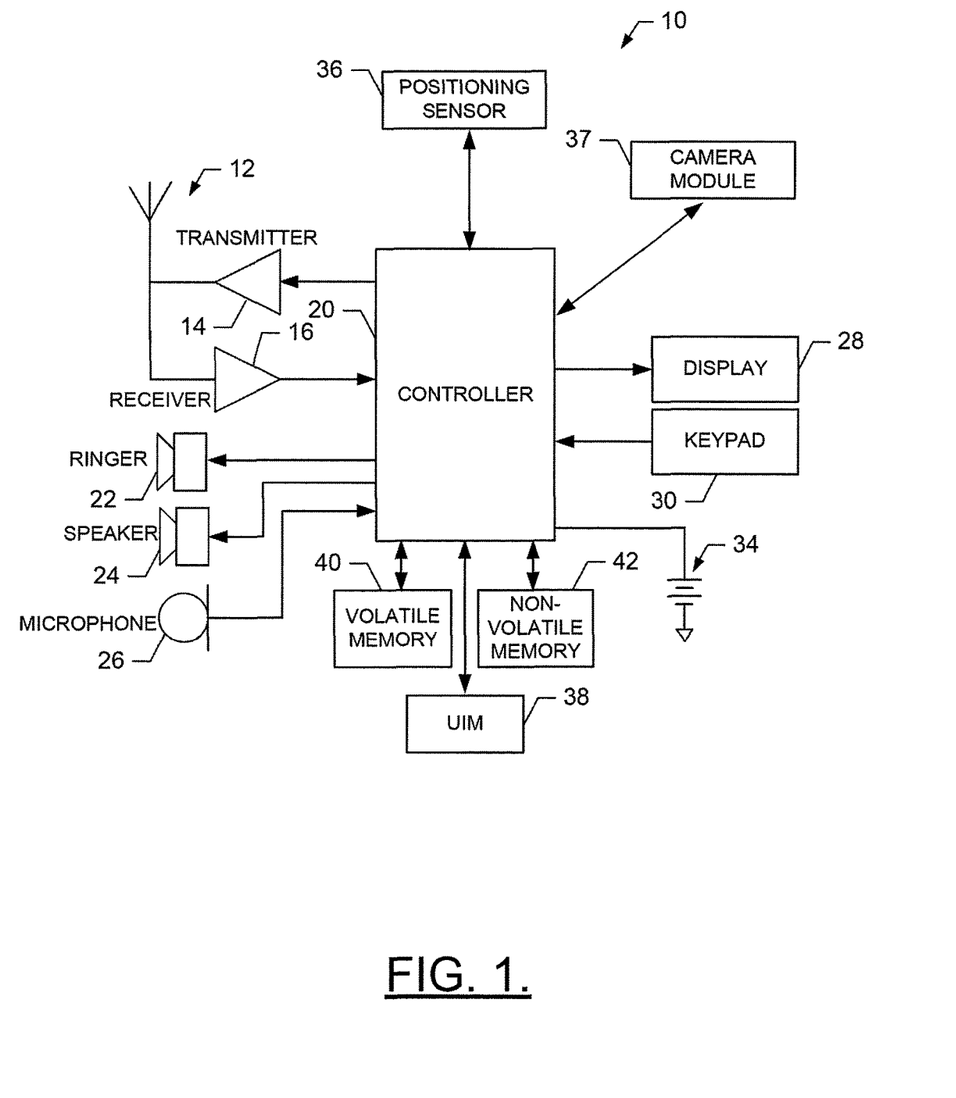
FIG. 1 is a schematic block diagram of a mobile terminal according to an exemplary embodiment of the present invention.

FIG. 1, one aspect of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output. In addition, the mobile terminal 10 may include a positioning sensor 36. The positioning sensor 36 may include, for example, a global positioning system (GPS) sensor, an assisted global positioning system (Assisted-GPS) sensor, etc. However, in one exemplary embodiment, the positioning sensor 36 includes a pedometer or inertial sensor. In this regard, the positioning sensor 36 is capable of determining a location of the mobile terminal 10, such as, for example, longitudinal and latitudinal directions of the mobile terminal 10, or a position relative to a reference point such as a destination or start point. Information from the positioning sensor 36 may then be communicated to a memory of the mobile terminal 10 or to another memory device to be stored as a position history or location information.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication. In conjunction with the positioning sensor 36, the cell id information may be used to more accurately determine a location of the mobile terminal 10.

In an exemplary embodiment, the mobile terminal 10 includes a media capturing module, such as a camera, video and/or audio module, in communication with the controller 20. The media capturing module may be any means for capturing an image, video and/or audio for storage, display or transmission. For example, in an exemplary embodiment in which the media capturing module is a camera module 37, the camera module 37 may include a digital camera capable of forming a digital image file from a captured image, or a video file from a series of captured image frames with or without accompanying audio data. As such, the camera module 37 includes all hardware, such as a lens or other optical device, and software necessary for creating a digital image, video or audio file from captured image/audio data. Alternatively, the camera module 37 may include only the hardware needed to capture an image, while a memory device of the mobile terminal 10 stores instructions for execution by the controller 20 in the form of software necessary to create a digital image file from a captured image. In an exemplary embodiment, the camera module 37 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format.

Figure 2:
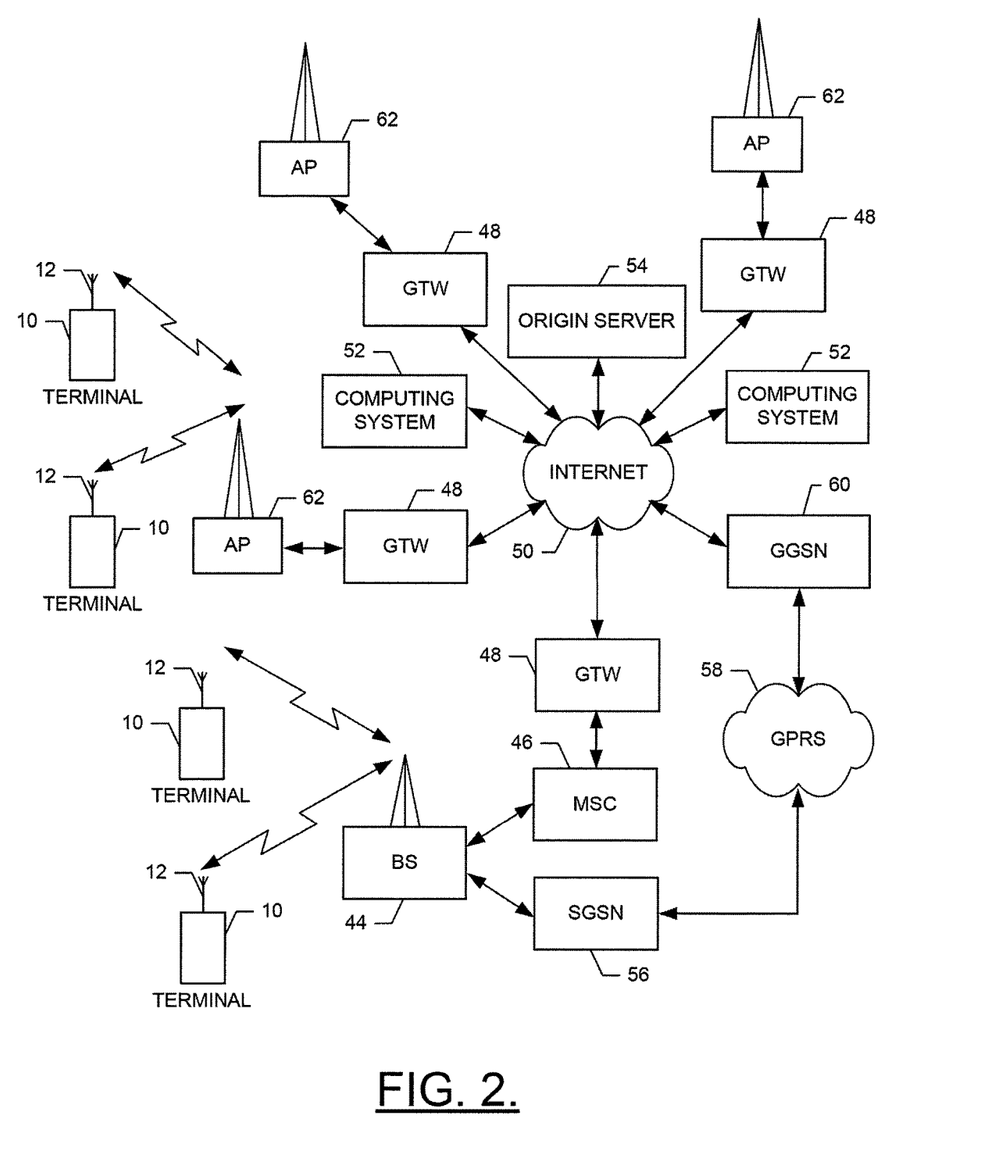
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content sharing) between the mobile terminal 10 and other mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a camera, server, personal computer or other device, absent any communication with the system of FIG. 2.

An exemplary embodiment of the invention will now be described with reference to FIG. 3, in which certain elements of an apparatus for enabling a user to access a dynamic attribute associated with a service point are displayed. The apparatus of FIG. 3 may be embodied as or otherwise employed, for example, on a network device such as a server of FIG. 2. However, it should be noted that the system of FIG. 3, may also be employed on a variety of other devices, both mobile and fixed, and therefore, the present invention should not be limited to application on devices such as servers. It should also be noted that while FIG. 3 illustrates one example of a configuration of an apparatus for enabling a user to access a dynamic attribute associated with a service point, numerous other configurations may also be used to implement embodiments of the present invention.

Figure 3:
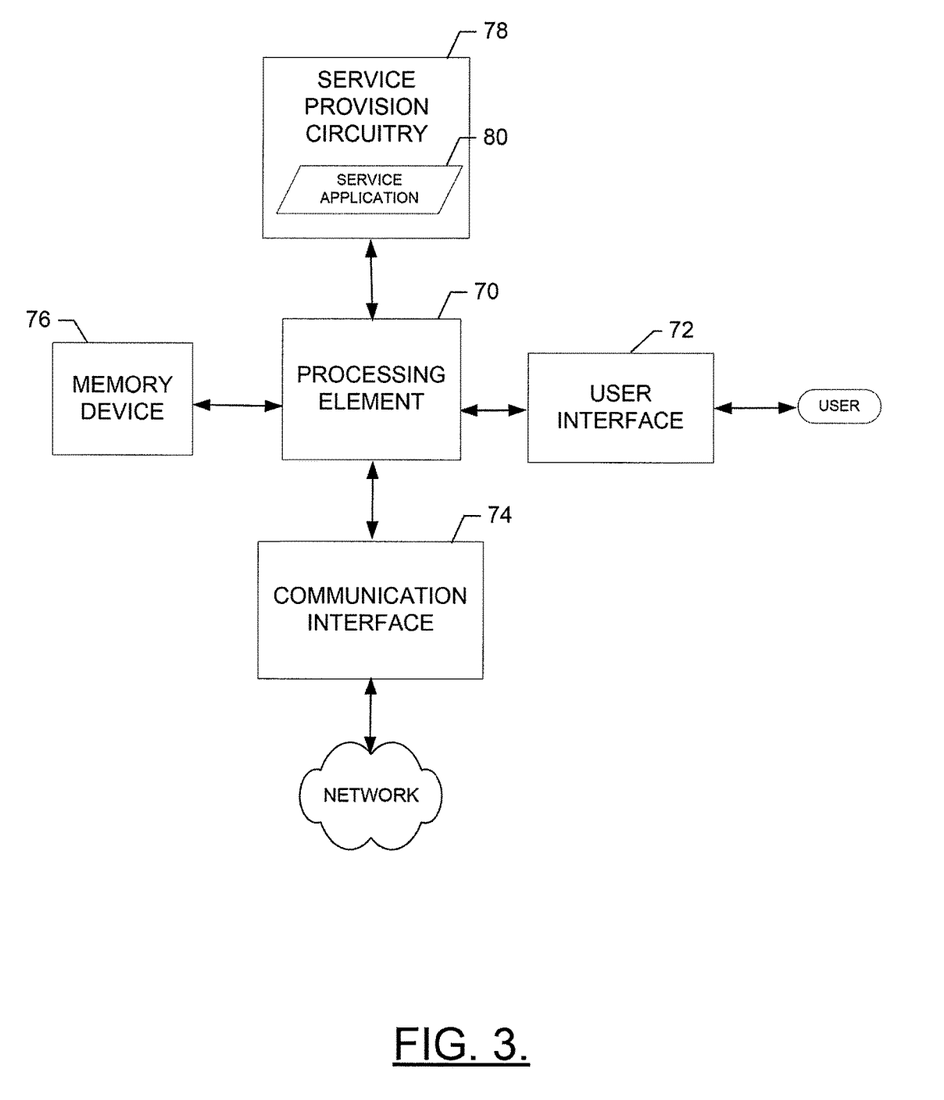
FIG. 3 illustrates a block diagram of an apparatus for enabling a user to access a dynamic attribute associated with a service point according to an exemplary embodiment of the present invention.

Referring now to FIG. 3, an apparatus for enabling a user to access a dynamic attribute associated with a service point is provided. The apparatus may include or otherwise be in communication with a processing element 70, a user interface 72, a communication interface 74 and a memory device 76. The memory device 76 may include, for example, volatile and/or non-volatile memory (e.g., volatile memory 40 and/or non-volatile memory 42). The memory device 76 may be configured to store information, data, applications, instructions or the like for enabling the apparatus to carry out various functions in accordance with exemplary embodiments of the present invention. For example, the memory device 76 could be configured to buffer input data for processing by the processing element 70. Additionally or alternatively, the memory device 76 could be configured to store instructions for execution by the processing element 70. As yet another alternative, the memory device 76 may be one of a plurality of databases that store information in the form of static and/or dynamic information, for example, in association with a particular location, event or service point.

The processing element 70 may be embodied in a number of different ways. For example, the processing element 70 may be embodied as a processor, a coprocessor, a controller or various other processing means or devices including integrated circuits such as, for example, an ASIC (application specific integrated circuit). In an exemplary embodiment, the processing element 70 may be configured to execute instructions stored in the memory device 76 or otherwise accessible to the processing element 70. Meanwhile, the communication interface 74 may be embodied as any device or means embodied in either hardware, software, or a combination of hardware and software that is configured to receive and/or transmit data from/to a network and/or any other device or module in communication with the apparatus. In this regard, the communication interface 74 may include, for example, an antenna and supporting hardware and/or software for enabling communications with a wireless communication network.

The user interface 72 may be in communication with the processing element 70 to receive an indication of a user input at the user interface 72 and/or to provide an audible, visual, mechanical or other output to the user. As such, the user interface 72 may include, for example, a keyboard, a mouse, a joystick, a touch screen display, a conventional display, a microphone, a speaker, or other input/output mechanisms. In an exemplary embodiment in which the apparatus is embodied as a server, the user interface 72 may be limited, or eliminated.

In an exemplary embodiment, the processing element 70 may be embodied as or otherwise control service provision circuitry 78. In this regard, for example, the service provision circuitry 78 may include structure for executing a service application 80. The service application 80 may be an application including instructions for execution of various functions in association with embodiments of the present invention. In an exemplary embodiment, the service application 80 may include or otherwise communicate with applications and/or circuitry for providing a mapping service and/or a search service. The mapping service may further include routing services and/or directory or look-up services related to particular service point (e.g., business, venue, party or event location, address, site or other entity related to a particular geographic location and/or event). As such, according to an exemplary embodiment, the processing element 70 (for example, via the service provision circuitry 78) may be configured to enable a user to access a dynamic attribute associated with a service point as will be described in greater detail below.

Figure 4:
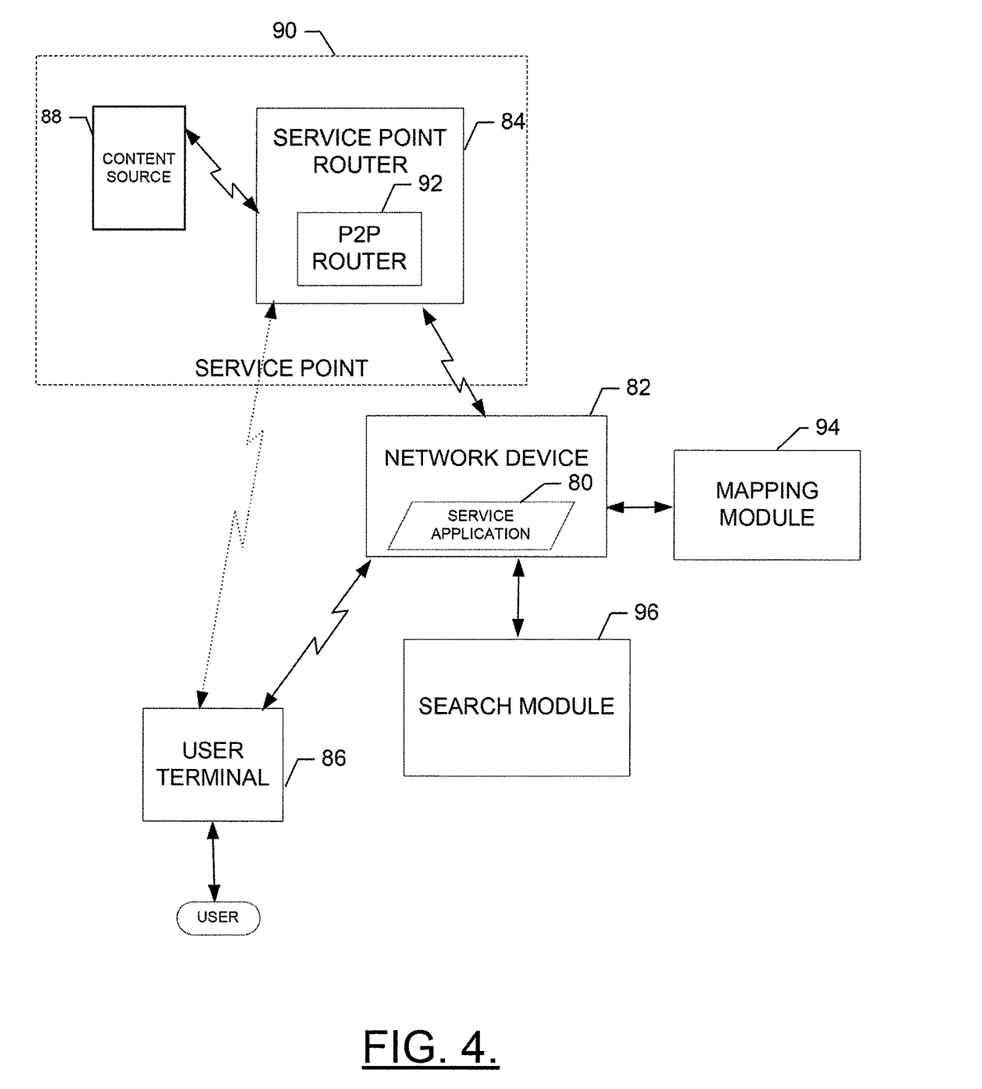
FIG. 4 illustrates a block diagram of portions of a system for enabling a user to access a dynamic attribute associated with a service point according to an exemplary embodiment of the present invention.

FIG. 4 illustrates an embodiment of the present invention in which certain elements of a system for enabling a user to access a dynamic attribute associated with a service point are displayed. The system of FIG. 4 may be employed in connection with the mobile terminal 10 of FIG. 1 and/or the network illustrated in reference to FIG. 2. However, although FIG. 4 illustrates an embodiment of the present invention being practiced in connection with a network device 82 (e.g., a server) that coordinates functionality associated with practicing embodiments of the invention in combination with other devices, it should be noted that the system of FIG. 4 may also be employed on a variety of other devices, both mobile and fixed, and therefore, the present invention should not be limited to application on devices such as servers or in combination with the specific devices illustrated in FIG. 4. As such, it should be appreciated that while FIG. 4 illustrates one example of a configuration of a system for enabling a user to access a dynamic attribute associated with a service point, numerous other configurations may also be used to implement embodiments of the present invention. As such, the devices or elements described below may not be mandatory and thus some may be omitted in certain embodiments. Moreover, embodiments of the present invention need not be practiced at a single device, but rather combinations of devices may collaborate to perform embodiments of the present invention.

Referring now to FIG. 4, a system for enabling a user to access a dynamic attribute associated with a service point is provided. The system may include the network device 82, which may be in communication with a service point router 84 and a user terminal 86. The service point router 84 may be in communication a content source 88. In an exemplary embodiment, the user terminal 86 and the content source 88 may each be an example of the mobile terminal 10 of FIG. 1 or a similar device. Meanwhile, the network device 82 may be an example of a device similar to the apparatus of FIG. 3.

In an exemplary embodiment, the content source 88 may be assumed to be at or proximate to a service point 90 corresponding to an entity associated with a particular geographic location. Moreover, the content source 88 may be, for example, creating, capturing, producing or storing a dynamic attribute associated with the service point 90. Users of mobile and non-mobile devices are typically familiar with accessing static attributes associated with service points. For example, the street address, telephone number, email address, menu, show times, and other static information related to a service point may be considered static attributes (e.g., permanent or semi-permanent (i.e., fixed for a certain period of time) attributes). A dynamic attribute may therefore be defined as a characteristic associated with an event or location that is changeable in an unpredictable fashion or at unpredictable times. For example, video or audio content that are currently being recorded (or recently recorded) may be considered as dynamic attributes. Additionally, a release of images captured at or near the service point or related to an event associated with the service point (e.g., sports action photos), dynamic information on current seating capacity, dynamic information on the presence and/or availability of hot/fresh or newly released goods, movie trailers for movies playing within a predefined period of time, etc., may all be considered as dynamic attributes. Hereinafter, an embodiment of the present invention will be described in terms of an example in which the dynamic attribute relates to content including video that is being streamed from the content source 88. However, the example provided should not be viewed as limiting embodiments of the present invention.

According to the present example, the content source 88 may be a mobile phone or other device (e.g., the mobile terminal 10) capable of communicating streaming video captured at the service point 90 (e.g., via a WLAN) to the service point router 84. The service point router 84 may subsequently communicate an indication of the availability of the video stream associated with the service point 90 to the network device 82. As will be described in greater detail below, in response to receipt of an indication that the video stream associated with the service point 90 is available, the network device 82 may be configured to indicate the availability of the video stream to an end user at the user terminal 86 (e.g., another example of the mobile terminal 10). If the user provides a selection of the video stream (e.g., via a user interface of the user terminal 86), the network device 82 may initiate a connection between the service point router 84 (or the content source 88) to facilitate sharing of the video stream. In an exemplary embodiment, the connection may be a P2P connection.

The service point router 84 may be any means or device embodied in hardware, software, or a combination of hardware and software that is configured to pass logically addressed packets from their source (e.g., the content source 88) toward their destination (e.g., the network device 82 or the user terminal 86) through intermediary nodes where necessary. In one embodiment, the service point router 84 may be configured to perform its function of routing packets based on routing tables, which may be either simple or complex based on the complexity of the network in which the service point router 84 operates. Since routers often join two networks together, it is becoming increasingly common for individual homes, businesses or other entities to utilize routers to connect local area networks (LANs) to the Internet, a cellular network, or some other network. As such, for example, the service point router 84 may be a part of a WLAN associated with the service point 90.

In an exemplary embodiment, the service point router 84 may be embodied as, or further include a P2P router 92. The P2P router 92 may be configured to set up communication between peer devices in a P2P network. A P2P network is generally considered a network that relies primarily on the computing power and bandwidth of the devices (i.e., peers) within the network. Accordingly, P2P networks generally do not concentrate computing power and bandwidth within particular servers. Rather each of the peer devices is capable of simultaneously functioning as both a client and a server to other nodes of the P2P network. The architecture of P2P networks typically involves connecting nodes via largely ad hoc connections over which participant nodes can, for example, share content files containing audio, video, data or virtually anything in a digital format. A P2P connection between participant nodes may or may not be mediated via other nodes (not shown, but like user terminal 86), which share the load of content sharing to thereby reduce the load of the content source 88 or the service point router 84. Hence, a "P2P connection" as discussed herein may use protocols specific to content sharing in P2P networks, or other protocols appropriate for the required data communication. Accordingly, data such as real time data (e.g. streaming video) or telephony traffic could be shared using P2P network. As such, the P2P router 92 may be configured to establish a P2P connection between peer devices such as the service point router 84 (or the content source 88) and the user terminal 86 in accordance with known techniques upon receiving instructions to do so. According to an exemplary embodiment, the network device 82 may be configured to facilitate the connection between the service point router 84 (or the content source 88) and the user terminal 86 by, for example, providing the user terminal 86 with identification information corresponding to the service point router 84 (or the content source 88) to enable establishment of the P2P connection therebetween as indicated by the dotted arrow in FIG. 4. Accordingly, if the content forming the dynamic attribute is a video stream, for example, the user terminal 86 may launch, subsequent to selection of a dynamic attribute to view, an Internet Protocol television (IPTV) application at the user terminal 86 in order to view the streamed video via the P2P connection. As an alternative, the IPTV application may be launched subsequent to a command or indication from the network device 82 or the service point router 84 indicating either that the connection has been established, or that a request for the connection has been relayed to the service point router 84 (or the content source 88).

As indicated above, the network device 82 may be an example of the apparatus of FIG. 3. As such, a processing element of the network device 82 may be configured to execute the service application 80. In this regard, the service application 80 may receive an indication that the streaming video (e.g., the dynamic attribute) corresponding to the service point 90 is available. The processing element of the network device 82 (e.g., via the service application 80) may then be configured to provide an indication of the availability of the streaming video to the user terminal 86 and facilitate the connection between the user terminal 86 and the service point router 84 (or the content source 88). In an exemplary embodiment, the indication of the availability of the streaming video may be provided responsive to a request from a user. As such, the processing element of the network device 82 may be configured to store information related to the availability of the streaming video in association with the service point until such time as a request for such information is received. However, such information may also be presented proactively or without need for a request as will be seen below.

As indicated above, the service application 80 may include or otherwise communicate with applications and/or circuitry for providing a mapping service (e.g., mapping module 94) and/or a search service (e.g., search module 96). However, it should be noted that code, circuitry and/or instructions associated with the mapping module 94 and/or the search module 96 need not necessarily be modular. The mapping module 94 and/or the search module 96 may each be any means or device embodied in hardware, software or a combination of hardware and software that is configured to perform the corresponding functions of the mapping module 94 and/or the search module 96, respectively, as described below. In this regard, the mapping module 94 may be configured to display a map of a particular area. Moreover, the map displayed may include landmarks, roads, buildings, service points or numerous other geographical features. The mapping module 94 may be further configured to include routing services. For example, the mapping module 94 may be configured to determine one or more candidate routes between a current or starting location and a destination based on any known route determination methods. As such, for example, the mapping module 94 may provide route guidance to a particular service point. In this regard, the mapping module 94 may include an application or algorithm for determining possible routes such as, for example, Mapquest or other known route determination applications. Accordingly, the mapping module 94 may be configured to determine candidate routes using operational information such as driving time, driving distance, fuel consumption, battery consumption, etc. The mapping module 94 may incorporate into the map display various ones of the geographical features and other supplemental information about a particular service point. For example, the mapping module 94 may display an icon or another identifier that is indicative of the availability of a dynamic attribute in association with the particular service point.

In an exemplary embodiment, the search module 96 may include a search engine configured to receive a query or search term identification and search various accessible sources (e.g., databases such as may be included in the memory device 76) for information associated with the query or search term identification. The information may be, for example, static and/or dynamic attributes associated with the query. As such, according to an exemplary embodiment, in response to a search associated with a service point (e.g., a search for the title or name of the service point or a search associated with an event or service provided at the service point), the search module 96 may be configured to provide an indication of a dynamic attribute associated with the service point. Moreover, if there are multiple dynamic attributes associated with the service point, the search module 96 may provide a listing of the dynamic attributes, from which list the user may select one or more of the dynamic attributes to access the selected dynamic attributes.

In an exemplary embodiment, the search module 96 and the mapping module 94 may be operated in combination to provide directory or look-up services related to a particular service point. As such, for example, a search for a nightclub may result in a listing of nightclubs (e.g., a service point for nighttime entertainment, drinks and/or dancing) and an indication (as provided by the service application 80) with regard to the availability of one or more dynamic attributes in association with one or more of the listed nightclubs may be provided to the user requesting the directory or look-up service (e.g., at the user terminal 86). Alternatively or additionally, nightclubs in a particular defined area may be presented on the map display along with an indication regarding the availability of dynamic attributes at corresponding ones of the nightclubs on the map display. The user may then select a dynamic attribute from the list or directly from an icon or identifier on the map display in order to access the dynamic attribute. In a case where the dynamic attribute is streamed video, the user may access the streamed video and get a preview of activity or conditions at the corresponding nightclub (e.g., via IPTV over a P2P connection). The user may then decide to visit the corresponding nightclub (or select another nightclub with more desirable conditions as determined based on corresponding dynamic attributes) and receive route guidance thereto.

Figure 5:
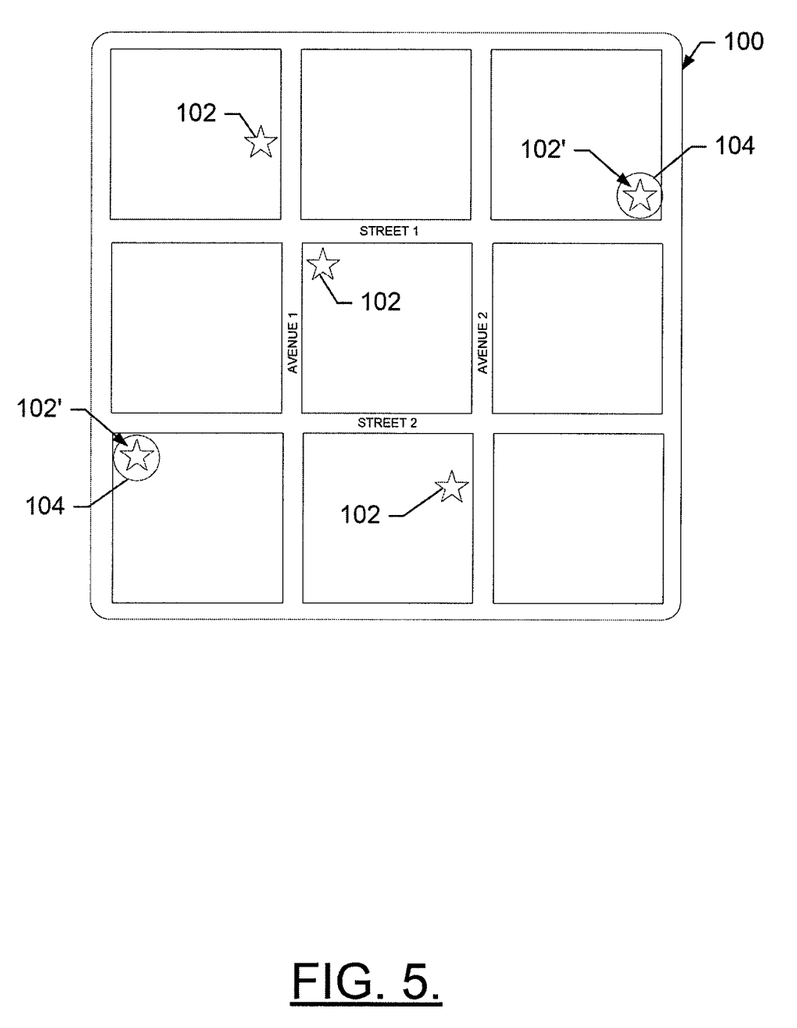
FIG. 5 illustrates an example of a map display according to an exemplary embodiment of the present invention.

FIG. 5 illustrates an example of a map display 100 in which various service points 102 are indicated. It may be assumed, for example, that the service points 102 were identified responsive to a search for a particular service associated with each of the service points 102. As illustrated in FIG. 5, the service points 102 may be illustrated with a star shape corresponding to a location of the corresponding service point. However, numerous other shapes or mechanisms of identifying service points may also be used. Some of the service points 102' (which are identified, for example, with a circled star), may correspond to service points that have an associated dynamic attribute available. As such, the circle around the star may be considered to be an indicator 104 of the availability of a dynamic attribute associated with the corresponding service point. In an exemplary embodiment, a number of the dynamic attributes (if more than one are available) associated with a particular service point may also be indicated either by a different symbol, additional symbols (e.g., a number corresponding to the number of dynamic attributes), or alterations such as color, size or shape of the symbol. In yet another embodiment, the map display 100 may be generated to show any (or particular sets of) service points in a particular area that have dynamic attributes associated therewith, without prior execution of a search function. In other words, the presence or display of indicators related to dynamic attributes may be a selectable feature of the map display 100.

Other modifications to the basic description above may also be provided. For example, in a situation in which numerous dynamic attributes are being generated from a single service point, an entity or device at the service point (e.g., the service point router 84) may be configured to sample from any of the numerous dynamic attributes to produce a comprehensive (or mixed) dynamic attribute. In this regard, for example, if multiple video streams are being generated from a nightclub, an operator at the service point router 84 may view some or all of the multiple video streams and select one or more of the multiple video streams to switch between or otherwise include in the comprehensive dynamic attribute. Accordingly, when a connection is sought by a terminal desiring access to the dynamic attribute, the service point router 84 may provide the comprehensive dynamic attribute instead of any one or more of the dynamic attributes themselves. As yet another alternative, the user may be enabled to select any one of the dynamic attributes or the comprehensive dynamic attribute.

Another modification may include an indication, for example, on the map display or in a search results listing of service points which often (although maybe not currently) have associated dynamic attributes available. Furthermore, statistics regarding information such as the frequency, length, dates/times, etc., of availability of dynamic attributes at a particular service point may be provided so that a user may know when to expect a higher likelihood of being able to view dynamic attributes associated with the particular service point. Moreover, a link or uniform resource locator (URL) may be provided to service points that often provide dynamic attributes. As such, search engine results may be presented on the basis of links being ranked based at least in part on a number or frequency of the availability of dynamic attributes.

Additionally, as suggested above, the service point router 84 need not necessarily be included in the system above. In this regard, for example, the network device 82 may be in direct communication with the content source 88 and may receive information indicative of the location of the content source 88. As such, when the content source 88 streams information (e.g., provides dynamic attributes) to the network device 82 (e.g., for storage and/or for later presentation via another content sharing mechanism such as, for example, My Space or YouTube), the network device 82 may be configured to enable other users to receive notification of the availability of the streamed information associated with the service point so that the streamed information may be accessed by other users as described above. As another alternative, metadata associated with the streamed information may be used to identify the corresponding service point associated with the streamed information. The content source 88 could also specify the service point in another way, such as by the title of the streamed information.

Figure 6:
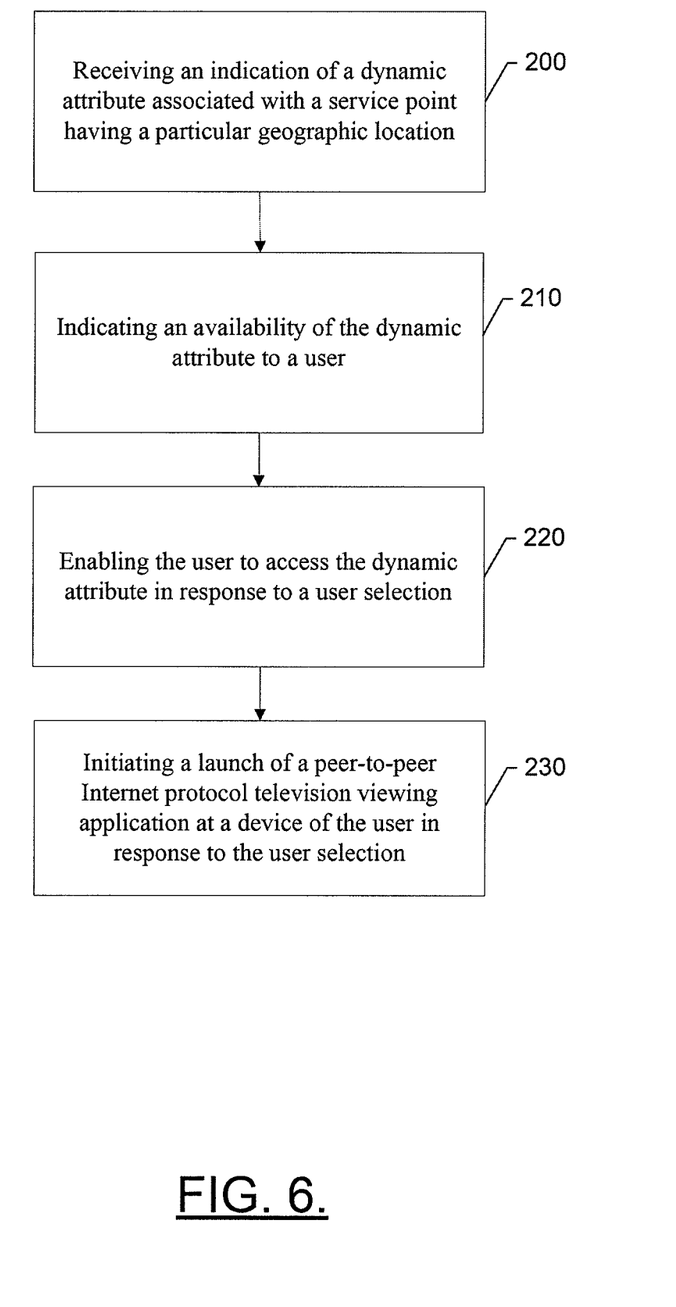
FIG. 6 is a flowchart according to an exemplary method for enabling a user to access a dynamic attribute associated with a service point according to an exemplary embodiment of the present invention.

FIG. 6 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal or network device and executed by a built-in processor in the mobile terminal or network device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for enabling a user to access a dynamic attribute associated with a service point as illustrated, for example, in FIG. 6 may include receiving an indication of a dynamic attribute associated with a service point having a particular geographic location at operation 200. The dynamic attribute may be provided from a mobile content source proximate to the particular geographic location. At operation 210, an availability of the dynamic attribute may be indicated to a user. The user may then be enabled to access the dynamic attribute in response to a user selection at operation 220.

In an exemplary embodiment, the indication of the dynamic attribute may include receiving an indication of media content provided at the service point. The media content may be a content stream. In another exemplary embodiment, the received content may have location information associated therewith in which the location information corresponds to the particular geographic location. Operation 210 may include indicating the availability of the dynamic attribute in response to a search associated with the service point or indicating the availability of the dynamic attribute on a map displaying a location of the service point.

Operation 220 may include enabling the user to establish a peer-to-peer connection with an entity providing the dynamic attribute. In one embodiment, enabling the user to establish the peer-to-peer connection with the entity providing the dynamic attribute may include enabling the user to establish a peer-to-peer connection with a device associated with the service point or with a device of an individual located at the service point. In another exemplary embodiment, operation 220 may include enabling the user to access content that comprises a mix of content from various content sources associated with the service point. In an optional embodiment, the method may further include operation 230 including initiating a launch of an application at a device of the user in response to the user selection. The application may be a peer-to-peer Internet protocol television viewing application or other television viewing application.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving, by a remotely located device, indications of a plurality of dynamic attributes, each dynamic attribute associated with a respective service point having a particular geographic location and being provided from a mobile content source proximate to the particular geographic location;
   displaying, on the remotely located device, each respective service point as a symbol at a corresponding geographic location on a map to indicate availability of at least one of the dynamic attributes at the corresponding geographic location;
   for each service point, indicating by at least one of a symbol color, a symbol size, a symbol shape, and an additional symbol in response to two or more dynamic attributes being available at the each service point, the dynamic attributes comprising live media contents provided at the respective service points;
   providing information on how often dynamic attributes are available at each service point;
   enabling the remotely located device to select one of the available dynamic attributes; and
   initiating viewing of the selected dynamic attribute at the remotely located device.

2. The method according to claim 1, wherein receiving the indications of the dynamic attributes comprises receiving indications of media contents provided at the respective service points.

3. The method according to claim 2, wherein receiving the indications further comprises receiving a content stream corresponding to the media contents.

4. The method according to claim 1, wherein indicating the availability of the dynamic attributes is in response to a search associated with the respective service point.

5. The method according to claim 1, wherein enabling the remotely located device to select one of the available dynamic attributes comprises enabling the remotely located device to establish a peer-to-peer connection with an entity providing the selected dynamic attribute.

6. The method according to claim 5, wherein initiating viewing of the selected dynamic attribute comprises initiating a launch of an application at the remotely located device, the application being a television viewing application.

7. The method according to claim 5, wherein enabling the remotely located device to establish the peer-to-peer connection with the entity providing the selected dynamic attribute comprises enabling the remotely located device to establish a peer-to-peer connection with a device associated with the service point.

8. The method according to claim 5, wherein enabling the remotely located device to establish the peer-to-peer connection with the entity providing the selected dynamic attribute comprises enabling the remotely located device to establish a peer-to-peer connection with a device of an individual located at the service point.

9. The method according to claim 1, wherein receiving the indications of the dynamic attributes comprises receiving streamed contents each having location information associated therewith in which the associated location information corresponds to the particular geographic location.

10. The method according to claim 1, wherein enabling the remotely located device to select one of the available dynamic attributes comprises enabling the remotely located device select content that comprises a mix of content from various content sources associated with the service point.

11. A computer program product comprising at least one non-transitory computer-readable storage medium having computer-readable program code portions stored therein, the computer-readable program code portions comprising:
    a first executable portion for receiving, by a remotely located device, indications of a plurality of dynamic attributes, each dynamic attribute associated with a respective service point having a particular geographic location and being provided from a mobile content source proximate to the particular geographic location;
    a second executable portion for displaying, on the remotely located device, each respective service point as a symbol at a corresponding geographic location on a map to indicate availability of at least one of the dynamic attributes at the corresponding geographic location;
    a third executable portion for indicating, for each service point, at least one of a symbol color, a symbol size, a symbol shape, and an additional symbol in response to two or more dynamic attributes being available at the service point, the dynamic attributes comprising live media contents provided at the respective service points;
    a fourth executable portion for providing information on how often dynamic attributes are available at each service point; and
    a fifth executable portion for enabling the remotely located device to select one of the available dynamic attributes.

12. The computer program product according to claim 11, wherein the first executable portion includes instructions for receiving indications of media contents provided at the respective service points.

13. The computer program product according to claim 11, wherein the second executable portion includes instructions for indicating the availability of the dynamic attributes in response to a search associated with the respective service point.

14. The computer program product according to claim 11, wherein the third executable portion includes instructions for enabling the remotely located device to establish a peer-to-peer connection with an entity providing the selected dynamic attribute.

15. The computer program product according to claim 11, wherein the first executable portion includes instructions for receiving streamed contents having location information associated therewith in which the associated location information corresponds to the particular geographic location.

16. An apparatus of a remote mobile device comprising a processor and memory including computer program code, the processor and the computer program code configured to, with the processor, cause the apparatus at least to:
    receive indications of a plurality of dynamic attributes, each dynamic attribute associated with a respective service point having a particular geographic location and being provided from a mobile content source proximate to the particular geographic location;
    display each respective service point as a symbol at a corresponding geographic location on a map to indicate availability of at least one of the dynamic attributes at the corresponding geographic location;
    for each service point, indicate by at least one of a symbol color, a symbol size, a symbol shape, and an additional symbol in response to two or more dynamic attributes being available at the each service point, the dynamic attributes comprising live media contents provided at the respective service points;
    provide information on how often dynamic attributes are available at each service point; and
    enable the remotely located device to select one of the available dynamic attributes.

17. The apparatus according to claim 16, wherein the memory and the computer program code are further configured to, with the processor, cause the apparatus to receive indications of media contents provided at the respective service points.

18. The apparatus according to claim 16, wherein the memory and the computer program code are further configured to, with the processor, cause the apparatus to indicate the availability of the dynamic attributes in response to a search associated with the respective service point.

19. The apparatus according to claim 16, wherein the memory and the computer program code are further configured to, with the processor, cause the apparatus to enable the remotely located device to establish a peer-to-peer connection with an entity providing the selected dynamic attribute.

20. The apparatus according to claim 16, wherein the memory and the computer program code are further configured to, with the processor, cause the apparatus to receive streamed contents each having location information associated therewith in which the associated location information corresponds to the particular geographic location.

* * * * *